(12) United States Patent
Bergh

(10) Patent No.: US 7,508,932 B1
(45) Date of Patent: Mar. 24, 2009

(54) CELL PHONE HOLDER HEADBAND

(76) Inventor: Richard Alan Bergh, 8207 W. Maynard Dr., Niles, IL (US) 60714

( * ) Notice: Subject to any disclaimer, the term of this patent is extended or adjusted under 35 U.S.C. 154(b) by 698 days.

(21) Appl. No.: 10/985,812

(22) Filed: Nov. 10, 2004

(51) Int. Cl.
*H04M 1/00* (2006.01)
*H04M 9/00* (2006.01)
*H04R 25/00* (2006.01)

(52) U.S. Cl. .................. 379/430; 379/446; 379/449; 379/455; 455/575.2; 381/376

(58) Field of Classification Search .............. 379/430, 379/446, 447, 449, 454, 455; 381/374, 376–379; 455/575.2, 575.6, 90.3; 224/181, 197, 272, 224/901
See application file for complete search history.

(56) References Cited

U.S. PATENT DOCUMENTS

| | | | |
|---|---|---|---|
| 4,484,029 A * | 11/1984 | Kenney | ..................... 455/575.2 |
| 4,802,211 A | 1/1989 | Huntley | |
| 5,233,650 A | 8/1993 | Chan | |
| 5,407,113 A | 4/1995 | Golliher | |
| 5,503,313 A | 4/1996 | Wei | |
| 5,689,558 A | 11/1997 | Osgood | |
| 5,706,345 A * | 1/1998 | Allen | ........................ 379/430 |
| 5,828,749 A | 10/1998 | Brodskiy | |
| 6,038,312 A | 3/2000 | Bromley | |
| 6,363,147 B1 | 3/2002 | Maxwell | |
| 6,374,090 B1 | 4/2002 | Morales | |
| 6,639,985 B1 | 10/2003 | Liu | |
| 7,120,247 B1 * | 10/2006 | Wade | ......................... 379/430 |
| 7,155,265 B2 * | 12/2006 | Medhin | ................... 455/575.1 |
| 2005/0284901 A1 * | 12/2005 | Taylor | ........................ 224/181 |

* cited by examiner

*Primary Examiner*—Curtis Kuntz
*Assistant Examiner*—Tuan D Nguyen

(57) ABSTRACT

A cell phone holder headband (1), when placed on the users had, enables the phone to stay in a normal talking position without having to hold it there with one hand. The cell phone is fit into an elastic band (7) that is looped through a plastic plate (5). An elastic strap was chosen to accept difference size 'Bar' and 'Flip' style cell phones. The plate is fitted to a swivel joint (2), that is connected to one end of the headband. The light weight acrylic band is adjustable (12) for a better fit to the users head and coils up (3) so the user can choose to use the phone still attached to the device, without Wearing the headband. This makes the device easy to store either on or off the phone. This swivel joint feature (2) locks into two positions (21), not only to allow the user to adjust the phone for a more comfortable talking position to the face, but also allows the phone to be worn and adjusted to accommodate either the left or right ear of the user. The cell phone holder headband (1) is relatively easy to construct and equally inexpensive to manufacture and produce.

3 Claims, 5 Drawing Sheets

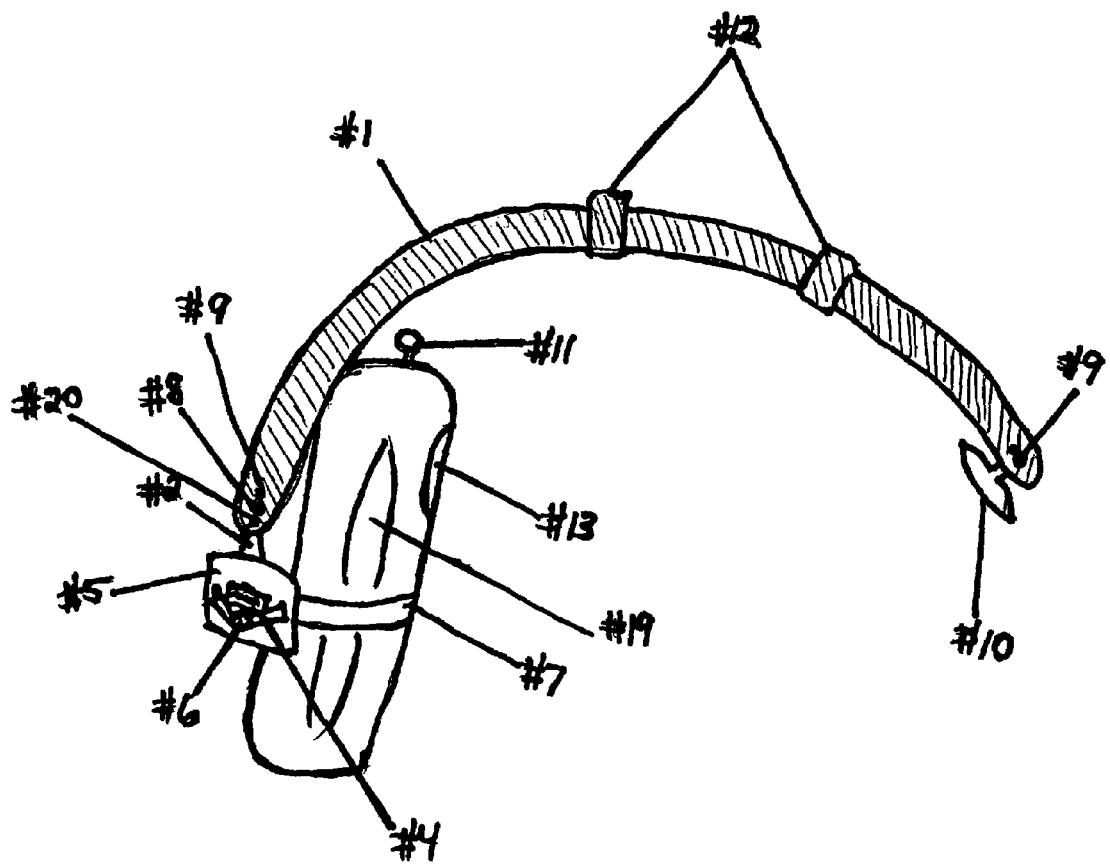

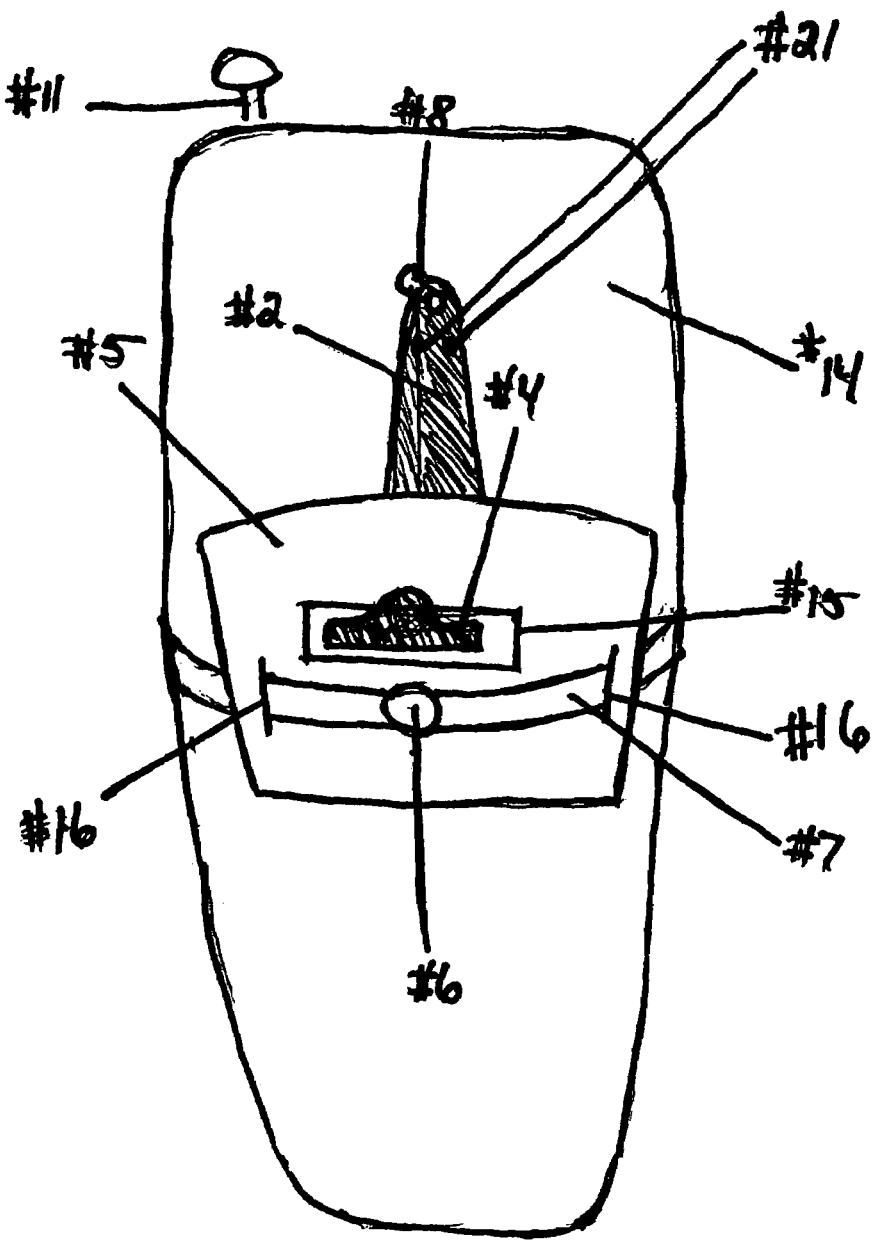
Figure #2

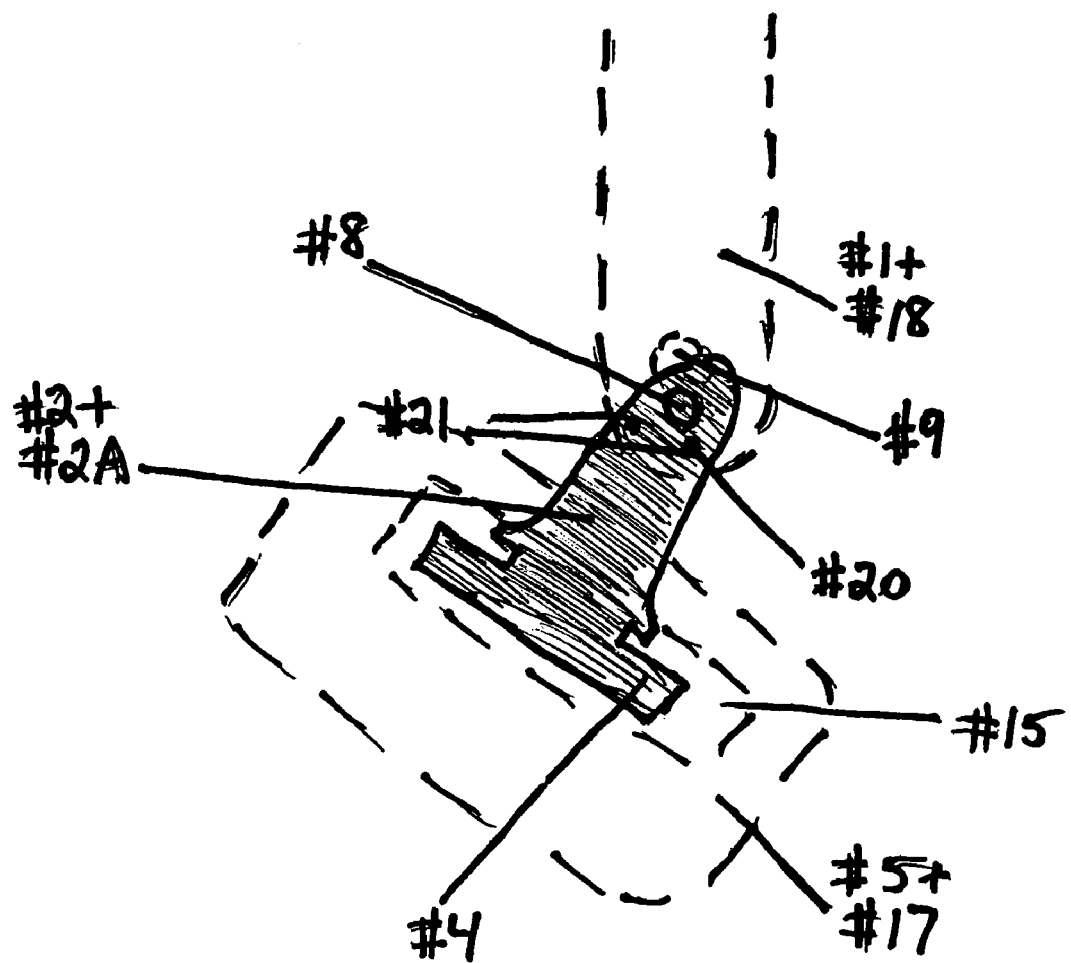

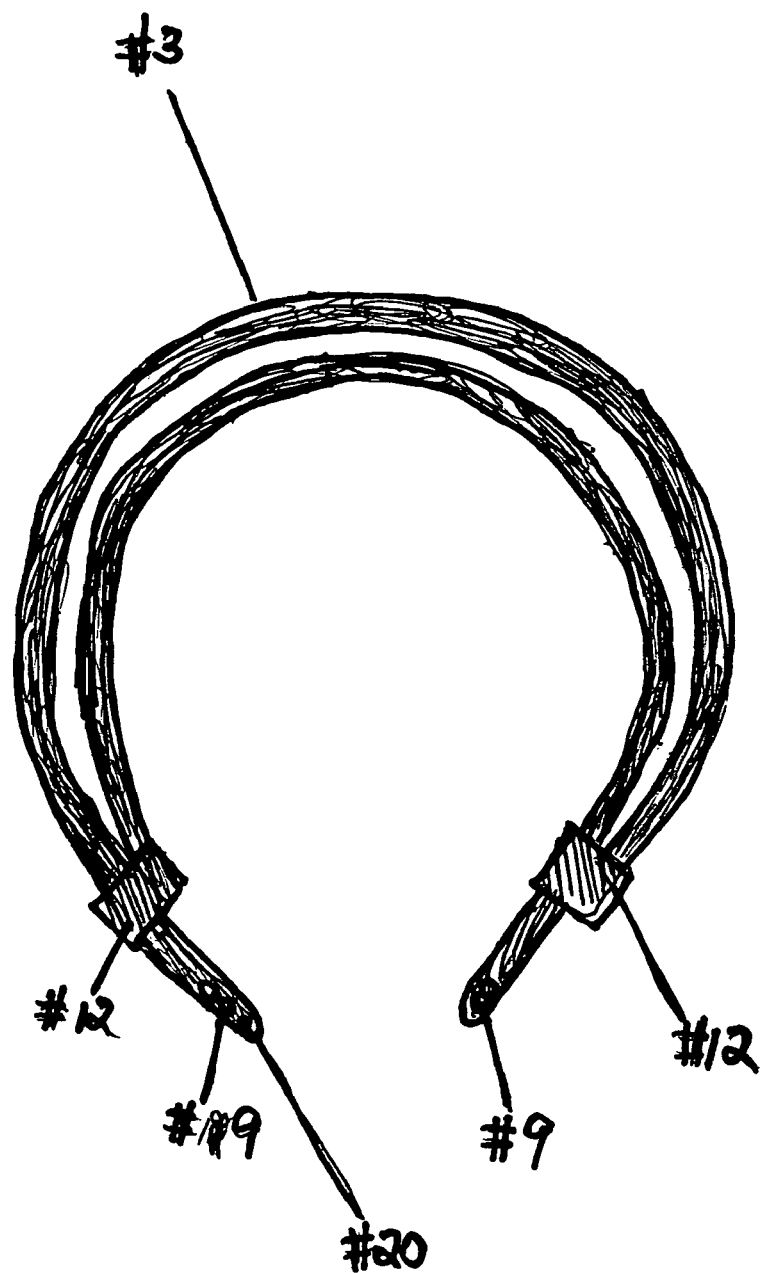

Figure #5
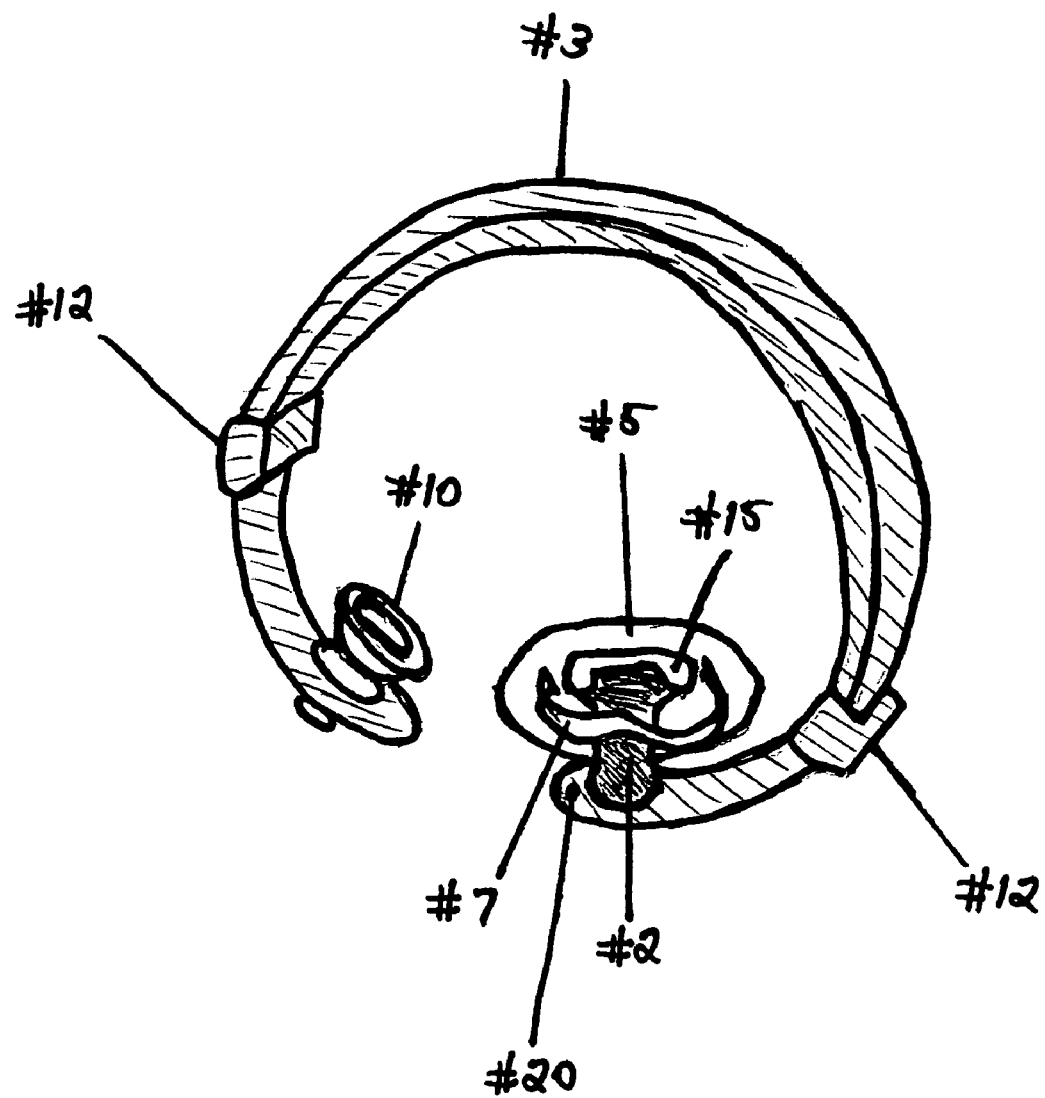

CELL PHONE HOLDER HEADBAND

CROSS-REFERENCE TO RELATED APPLICATIONS

None

FEDERALLY SPONSORED RESEARCH

None

SEQUENCE LISTING NONE

None

BACKGROUND OF THE INVENTION

1. Field of Invention

This invention relates to a cell phone holder headband for both 'Bar' type cell phones and 'Flip' phones.

2. Prior Art

Cell phones are generally used by holding the receiver located at the top of the phone to an ear and talking into the microphone located at the bottom of the unit, to pick up the voice.

Cell 'Flip' phones after been opened, have the microphone at the lowest part of the unit to again pick up the persons voice.

When a cell phone rings, the user usually answers the call by bringing the unit immediately to their ear, leaving little or no time to attach any device to the phone unless attached prior to the call.

Because of the cell phones ease of operation, they can normally be answered by a touch of any button on the key pad.

Unlike 'cordless' phones, cell phones do not need a base unit to transmit signals but rather send and receive signals directly from the unit itself. People use cell phones in every day life while engaged in a variety of activities ranging from walking, stocking shelves at stores, riding bikes, driving etc.

Users of cell phones for most activities, hold the cell phone with one hand, while trying to carry on other activities with the other.

Many people that talk on cell phones while they're driving, fail to pull over when dialing or to answer a call.

The prior art consists of other methods to allow hands free operation of a cell phone. U.S. Pat. No. 5,407,113 uses a strap to hold a phone to the users face which is attached to the back of the phone with adhesive fasteners. The strap wraps around the head to connect at the phones mouthpiece at the users chin. This design is not only noticeable when in use, but also makes it difficult to even speak.

A second device U.S. Pat. No. 4,802,211 consists of square cradle of rods that must be placed over the head and supported by the shoulders.

One rod extends upward utilizing 'L' shaped brackets in order to position the phone near the users face. Besides being difficult to wear, the design of this invention doesn't allow a user to turn their head and still be able to hear and speak. A similar idea U.S. Pat. No. 5,503,313 also utilizes a shoulder assembly with a belt going below the opposite arm. The phone holder is supported by means of a swivel assembly in order to position the phone to the face but unfortunately results in the same problems as the previous invention which is undoubtedly hard to take on and off, uncomfortable to wear and equally difficult to store.

A fourth approach U.S. Pat. No. 5,233,650 resembles audio earphones, that has a phone attached at one earpiece. Because the phone does not rest against the users ear but is on the other side of the devices ear pad, it makes its much more difficult to hear, especially if this invention would be used with a cell phone.

A fifth way of achieving a hands free approach, is a phone holder kit U.S. Pat. No. 5,828,749 that utilizes a flexible headband that is attached to an ear pad at one end and a large box like cradle at the other. The phone rests in this cradle making it difficult to dial and because of its size, too big to store in a pocket or purse.

Another creative idea for a telephone supporting device U.S. Pat. No. 6,038,312 has adjustment screws that must be turned to clamp the phone in place for each use. Besides being relatively time consuming to attach and detach, this device is most likely costly due to manufacturing tool and die machine screw parts and the headband must be unscrewed and separated for storage, unlike the ease provided by a coiled acrylic headband.

Still another, and seventh U.S. Pat. No. 6,363,147 has been a nylon mesh pocket that hangs from the side of a baseball cap. A phone is slipped into this material so that it rests along side the users face and is held in place by a cord attached to the brim of the cap. The person answering the call, must first remove their cap, place the phone into this pocket and then connect the cord before answering a call. Those who are not in the habit of wearing a cap, probably wouldn't want to use a device of this nature where a hat may be inappropriate. Two phone holders U.S. Pat. Nos. 6,639,985 and 6,374,090, both use and ear hanging assembly or bracket that wraps around a users ear to hold a cell phone attached by a clamp. Due to the weight of cell phones, this method for hands free operation can only be worn for very shorts periods of time due to discomfort with the inventions design. Finally a telephone handset holder U.S. Pat. No. 5,689,558 for various phones, has a headband with a bracket connected to one end that has studs that protrude straight out from said bracket. When a phone is placed at an angle on the inside of the bracket, it's attached by means of rubber bands, or elastic with loop ends to wrap around studs. Once fastened in place, the phone cannot be repositioned until it is taken off and refastened. Another negative includes the fact that it is hard to store in a pocket or a purse because of the sharp abrasive studs that can catch on fabric and possibly scratch the user. Being that connecting and disconnecting a phone to the handset holder is a difficult process due to its design, the device must be placed on a table or flat surface before and after each use for this task.

One advantage my invention offers, allows a user to keep the headband attached to the cell phone to store when not in use, so it can be easily uncoiled and placed on the head when answering a call. The cell phone holder headband can remain on the users head until the phone rings, and simply press any button on the keypad to answer. Since the phone is being held in place where one would normally hold it, the user can drive using both hands to steer, signal and freely turn their head to check blind spots for safer operation of a motor vehicle, bicycle or any other similar activity that may require two hands. The objects of my invention consists of an ear muff that has the cloth ear pieces removed from both sides, exposing plastic plates. The plastic plate at one end of the headband is unsnapped and replaced with a suction cup that is fit in the hole at the end of the headband. The remaining plastic plate, is cut into a square and has two slits cut into it, allowing an elastic band to pass through. The plastic plate stays secured to the headband, by a swivel joint. The acrylic headband is not only flexible but can be adjusted to fit the head of different users by means of adjustment loops, that permit the headband to lengthen or shorten. Because of the 'T' swivel joint mechanism, a cell phone can easily be attached while in a coiled position and also allow the phone to be positioned at an angle on the users face. The elastic strap is permanently attached by a fastener to a plastic plate, that moves up down to allow easier insertion of the cell phone. An additional feature that is incorporated into the design of this invention, enables the swivel joint to be locked into one of two positions, keeping the phone at an upward angle without dropping and offering the correct placement for the user to speak.

SUMMARY

This invention, the cell phone holder headband, is a device specifically constructed to adapt to bar and flip type cell phones. When either phone is slipped into the elastic loop attached to the headband, it allows the user to quickly apply the device and to position the phone, where one would normally hold it with one hand, to speak.

The device is engineered so that once the phone is attached, it can be positioned on either ear and locked into an angled position normally held while in use. The cell phone holder headband is also uniquely designed, so that when connected to the phone while in a coiled position, it allows the user to still dial and talk or store it in a pocket or purse while still attached, if so desired.

DRAWINGS

FIG. 1

Shows the cell phone holder headband extended with the phone attached.

FIG. 2

Illustrates the back of the cell phone without the headband attached.

FIG. 3

Is a close-up of how the swivel joined is attached to the headband and the square plastic plate.

FIG. 4

Reveals a drawing of the headband in a retracted position with nothing attached to it.

FIG. 5

Demonstrates the headband in a retracted position for attaching a cell phone, and for storage.

DETAILED DESCRIPTION

[FIG. 1] is an illustration of the cell phone Holder headband (#1) extended, with the cell phone (#19) attached to the headband by an elastic strap (#7) that is inserted through two slits (16) on a square plastic plate (#5) whereby the strap is secured by a fastener (#6) on the back of the plastic plate. A 'T' swivel joint (#4) is connected and snapped into place, allowing the square plastic piece to swivel. The 'T' swivel joint arm (#2) is attached to the headband by a knob (#8) that protrudes outward from the end of the swivel joint arm and inserts into a bigger hole on the headband (#9) and then forced into a smaller hole next to it, to snap it in place. The swivel joint knob allows the swivel joint arm to move from side to side and clicks into one of two positions, when the screw through the end of the headband (#20) catches on the notch holes (#21) on the swivel joint arm. This permits the cell phone to stay at an angle on the users face, and positioned for normal conversation.

The hole at the other end of the headband (#9) allows a suction cup (#10) to be attached in the same way as the swivel joint knob. The suction cup is used to reduce pressure, where it presses on the other side of the users head. The headband adjustments loops (#12) permit the user to change the bands fit or tension and allow it to retract for easier storage when not in use.

[FIG. 2] shows the back of the cell phone (#14) without the headband. The elastic strap (#7) stretches around the front of the phone and passes through the slits (16) on a plastic plate (#5) that is held to the back of the phone. The elastic strap, is secured by a fastener or strap (#6) connecting the square plastic plate to the back of the phone. The 'T' swivel joint (#4) is forced and snapped into a slot (#15) to permit the square plastic plate to swivel up-and-down. The swivel joint arm (#2) is attached to the headband by means of a knob (#8) at the end of the swivel joint arm and snapped into a hole at the end of the headband (#9). (#21), displays the location of the notches on the swivel joint arm.

[FIG. 3] illustrates a close-up of the 'T' swivel joint (#4) and arm (#2). The 'T' swivel joint (#4) is snapped into the square plastic plate (outline) (#17), and the swivel are knob (#8) is snapped into a hole (#9) at the end of the headband (outline) (#18). The screw that passes through the end of the headband (#20) catches on the notches (#21) on the swivel joint arm, to keep the phone at an angle.

[FIG. 4] is a drawing of the headband in a retracted position (#3) without the swivel joint arm (#2) attached to hole (#9) at one end of the headband and without the suction cup (10) attached to the other. The headband adjustment loops (#12) allow the acrylic band to pass through both loops, permitting the device to be shortened or extended. The user can also adjust the device while the phone is attached, to reduce its size and length when stored.

[FIG. 5] reveals the retracted position the headband should be in to insert the cell phone face up into the elastic strap, (#7) so it crosses just below the viewer screen. The back of the phone rests against the square plastic plate (#5) that is connected to a 'T' swivel joint (#4) allowing the phone to be moved up or down. The swivel joint arm (#2) attached to the headband by a protruding knob (#8) that snaps into place to permits the cell phone to swivel back and forth and lock into one of two notches (#21) on the swivel joints arm. A screw (#20) located at the end of the headband, catches on the notches to keep it in position. The headband adjustment loops (#12) are guides that allow the headband to retract or extend to fit the user, for attaching the cell phone to the device, or to minimize its size for storage.

Operation

In operation, this device enables the cell phone to be used in a normal manner with the exception that the cell phone holder headband, permits the user to converse in a hands free manner.

With the headband coiled, [FIG. 5] the cell phone is inserted into the elastic strap (#7) so it is positioned just below the viewer screen (#13) and the back of the phone rests against the square plastic plate (#5). The headband is uncoiled with one hand holding the phone fastened to the headband by the elastic strap, while the other hand holds and pulls the other end of the headband fitted with the suction cup (10). The headband is extended so it is arched as in [FIG. 1]. Then the device is placed on the head so the cell phones speaker is placed against one ear and the suction cup at the other end of the headband is on the other side of the head. Once the device is secure on the users head, a swivel joint (#2) allows the phone to be angled securely into one of two positions to accommodate a more comfortable talking position, as in [FIG. 3]. The device when taken off the users head, automatically coils and can remains affixed to the phone, so the user can easily reapply the device to answer or make another call.

The headband can be retracted, or shortened by simply pushing the bands together towards the middle and through the adjustment loops (#12). With the headband coiled around the phone, the user can still dial and talk or store it in a pocket or purse.

In conclusion, the cellphone holder headband is a convenient and easy way to talk on a cell phone in a hands-free manner. The device is designed in a way to make it easy to attach the phone to the headband, and equally easy to adjust it for use. Because the headband coils and adjusts, it allows one to use the phone while attached to the device, even when not wearing the headband.

REFERENCE TO NUMERALS

1—Headband in extended position
2—Swivel joint arm
3—Headband in retracted position
4—'T' swivel joint
5—Square plastic plate
6—Fastener for elastic band
7—Elastic band
8—Connecting knob for swivel joint arm
9—Holes to attach suction cup and 'T' swivel joint at both ends of headband
10—Suction cup
11—Antenna
12—Headband adjustment loops
13—Cell phone viewer screen
14—Back of cell phone
15—Rectangular hole in square plastic plate where 'T' end of swivel joint connects
16—Slits in square plastic plate to allow elastic band to pass through
17—Outline of square plastic plate
18—Outline of headband attached to protruding knob of swivel joint arm
19—Side of cell phone
20—Screw through end of headband
21—Notches in swivel joint arm

The invention claimed is:

1. A holder for carrying a telephone on the head of a user near the user's ear comprising: a flexible headband having first and second ends and including a pair of contiguous resilient bands adjustably coupled together to allow said bands to be moved relative to one another to lengthen and shorten the length of said headband, said headband being bendable between a curled closed position and a generally U-shaped open position for placement upon the user's head with an end on either side thereof; a contact piece coupled to said first end of said headband adapted for placement on one side of the user's head; an arm having first and second connecting portions, said arm first portion being pivotally connected to said second end of said headband; a plate pivotally connected to said arm second portion; an elastic strap fixed to said plate adapted to be wrapped around said telephone to releasably hold said telephone adjacent said plate with said telephone located between said plate and the side of the user's head opposite said contact piece, whereby the pivotal connections enable the telephone to be positioned at various angles to the user's head and on either side thereof; wherein said plate includes a pair of spaced holes and said strap extends through said holes and is held therein; wherein said second end of the headband has a hole defined therein, said arm first portion has a raised knob adapted to be inserted through said hole and held thereby, and said arm second portion is generally T-shaped with extending arms pivotally coupled to a cooperating mounting carded by said plate and wherein said second end of the headband has a projection and said arm has a plurality of cooperating recesses to releasably lock said plate in a user selected position when said projection is aligned in one of said recesses.

2. The holder of claim 1 wherein said first end of the headband has a hole defined therein and said contact piece is a suction cup with a raised knob adapted to be inserted through said hole and held thereby.

3. The holder of claim 1 wherein each of said bands has inner and outer ends and includes a bracket adjacent its inner end with each band passing through the bracket of the other band.

* * * * *